(12) United States Patent
Milks

(10) Patent No.: US 7,731,249 B2
(45) Date of Patent: Jun. 8, 2010

(54) MECHANISM FOR LOCKING A VENT COVER WITH A BASE

(75) Inventor: Stephen A. Milks, Lapeer, MI (US); Penny Milks, legal representative, Lapeer, MI (US)

(73) Assignee: Fan-Tastic Vent, Imlay City, MI (US)

( * ) Notice: Subject to any disclaimer, the term of this patent is extended or adjusted under 35 U.S.C. 154(b) by 256 days.

(21) Appl. No.: 11/811,200

(22) Filed: Jun. 8, 2007

(65) Prior Publication Data
US 2008/0303294 A1 Dec. 11, 2008

(51) Int. Cl.
*E05C 19/10* (2006.01)
*E05C 3/06* (2006.01)

(52) U.S. Cl. .................. 292/100; 292/95; 292/108; 292/194; 292/200; 292/210; 292/304

(58) Field of Classification Search .......... 292/44–55, 292/95–108, 116–120, 194–196, 200, 21, 292/210, 240, 241, 342
See application file for complete search history.

(56) References Cited

U.S. PATENT DOCUMENTS

| | | | | | |
|---|---|---|---|---|---|
| 370,229 | A | * | 9/1887 | Abrams ........................ | 292/54 |
| 668,019 | A | * | 2/1901 | Reid ........................... | 292/241 |
| 777,456 | A | * | 12/1904 | Wands ......................... | 292/57 |
| 1,064,278 | A | * | 6/1913 | Beaver ........................ | 292/213 |
| 1,378,518 | A | * | 5/1921 | Boardman ..................... | 5/100 |
| 1,513,234 | A | * | 10/1924 | Fritsch ........................ | 292/101 |
| 2,257,791 | A | * | 10/1941 | Edmister ..................... | 16/290 |
| 2,263,842 | A | * | 11/1941 | Gross ......................... | 220/324 |
| 2,506,553 | A | * | 5/1950 | Slaughter, Jr. et al. ....... | 292/240 |
| 2,607,102 | A | * | 8/1952 | Slaughter, Jr. ................. | 27/17 |
| 2,666,248 | A | * | 1/1954 | Slaughter, Jr. ................. | 27/17 |
| D180,783 | S | | 8/1957 | Helms et al. | |
| 2,964,808 | A | * | 12/1960 | Kloess, Jr. ................... | 49/213 |
| 3,010,125 | A | * | 11/1961 | Hedlund ....................... | 441/70 |
| 3,030,145 | A | | 4/1962 | Kottemann | |
| 3,144,574 | A | | 8/1964 | Henry-Baudot | |
| 3,280,353 | A | | 10/1966 | Haydon et al. | |
| 3,348,086 | A | | 10/1967 | Hiroshi Monma | |
| 3,566,165 | A | | 2/1971 | Lohr | |
| 3,647,251 | A | * | 3/1972 | Brown et al. ................. | 292/111 |
| 3,733,150 | A | | 5/1973 | Porter et al. | |

(Continued)

OTHER PUBLICATIONS

12V WindMachine provided by Jade Mountain found at http://www.jademountain.com/heatcool//windmaker.html, Jun. 2000.

(Continued)

*Primary Examiner*—Carlos Lugo
(74) *Attorney, Agent, or Firm*—Harness, Dickey & Pierce, P.L.C.

(57) ABSTRACT

A vent assembly has a locking mechanism to retain its cover on its base. The locking mechanism includes a latch and linkage coupled with the latch to move the latch between a locked and an unlocked position. A post member extends from the cover to cooperate with the latch such that in a locked condition, the cover is locked with the base in a closed position. When the latch is moved to a second position, the cover is enabled to pivot away from the base to an open position.

13 Claims, 4 Drawing Sheets

U.S. PATENT DOCUMENTS

| | | | |
|---|---|---|---|
| 3,860,404 A | 1/1975 | Jochimski | |
| 3,879,623 A | 4/1975 | Miyake | |
| 3,890,963 A | 6/1975 | Patterson | |
| 4,141,320 A | 2/1979 | Hatfield | |
| 4,303,844 A | 12/1981 | Suzuki | |
| 4,633,769 A | 1/1987 | Milks | |
| 4,684,839 A | 8/1987 | Fujisaki et al. | |
| 4,979,766 A * | 12/1990 | Wasilewski | 292/52 |
| 5,060,993 A * | 10/1991 | Maier | 292/241 |
| 5,099,181 A | 3/1992 | Canon | |
| 5,109,171 A | 4/1992 | Schmider | |
| 5,110,263 A | 5/1992 | Chiu | |
| 5,148,895 A | 9/1992 | Kakizaki | |
| 5,232,090 A | 8/1993 | Raab et al. | |
| 5,270,596 A | 12/1993 | Shibuya et al. | |
| 5,660,367 A | 8/1997 | Rush | |
| 5,725,356 A | 3/1998 | Carter | |
| 5,816,909 A * | 10/1998 | Wunder | 454/341 |
| 5,839,205 A | 11/1998 | Hung | |
| 5,887,916 A * | 3/1999 | Finkelstein et al. | 292/241 |
| 5,929,544 A | 7/1999 | Maekawa et al. | |
| 6,168,517 B1 | 1/2001 | Cook | |
| 6,309,192 B1 | 10/2001 | Litvin | |
| 6,440,190 B1 | 8/2002 | Goyetche | |
| 6,609,338 B2 * | 8/2003 | Hightower | 52/204.65 |
| 7,100,951 B2 * | 9/2006 | Jien | 292/207 |

OTHER PUBLICATIONS

12-Volt Fans provided by Chagnon's Outdoor World found at http://www.outdoor-catalog.com/power/air_fans.htm, Sep. 2001.
12-Volt Brushless Fan provided by Kollmann Marine, Inc. found at http://www.kollmann-marine.com/fans.html, Sep. 2001.
Oscillating 12 Volt Mini-Fan provided by Solar Generators found at http://www.solargenerators.com/fans.htm, Sep. 2001.
Ultra-Thin Line 12-Volt Electric Fans provided by Fluidyne Racing Products found at http://fluidyne.com/fans.html, Sep. 2001.
"Fan-Tastic Vent Model 4000R brochure", www.fantasticvent.com.
"Fan-Tastic Vent" printout of website, www.fantasticvent.com.

* cited by examiner

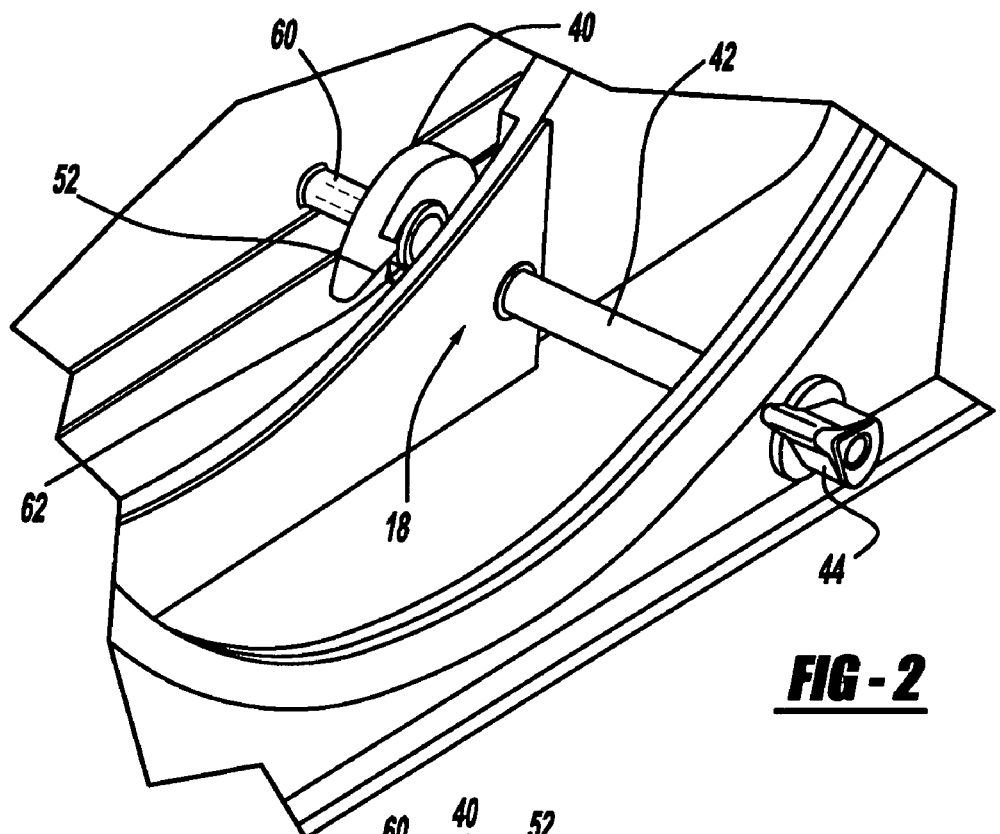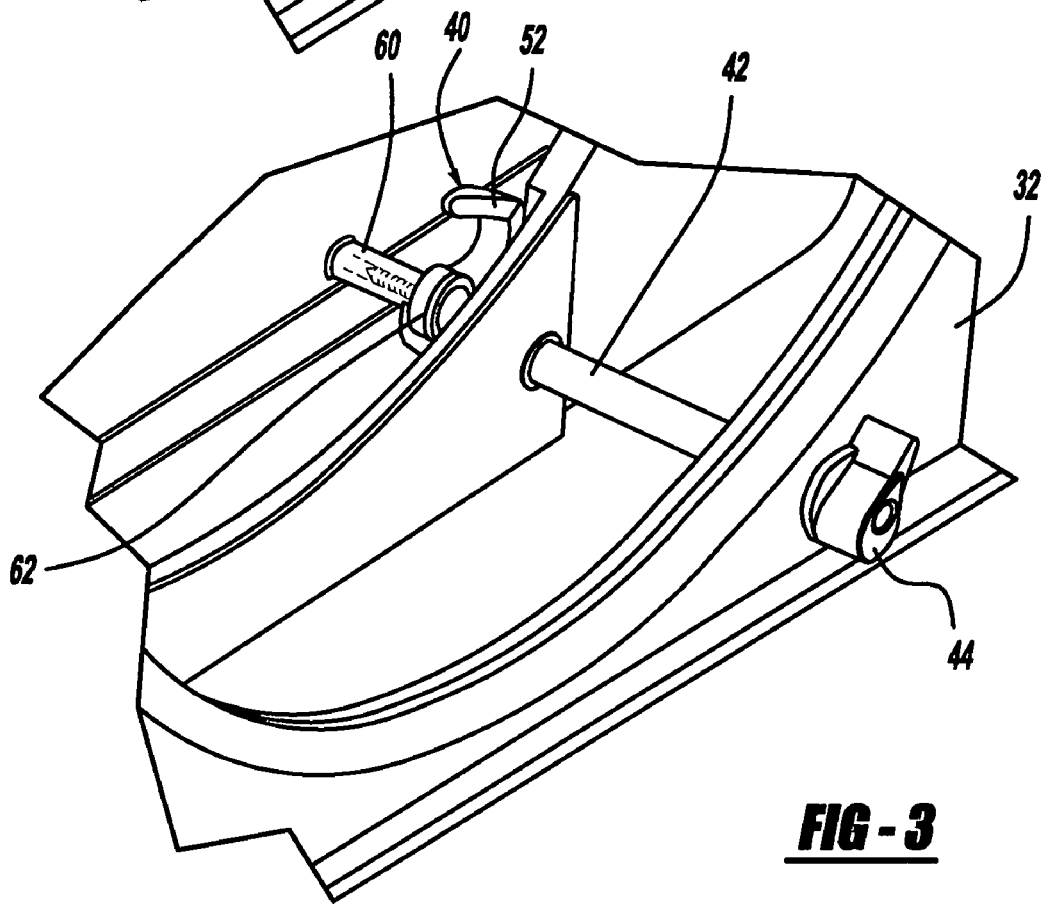

MECHANISM FOR LOCKING A VENT COVER WITH A BASE

FIELD

The present disclosure relates to vent assemblies for motor vehicles and, more particularly, to a locking mechanism to retain a cover in position.

BACKGROUND

In motor vehicles, such as motor coaches, which include a living area, it is desirable to have a vent assembly which enables the interior of the coach to vent. Ordinarily, a vent assembly is utilized with a fan that is capable of moving air either into or out of the interior of the motor coach. One such vent assembly is illustrated in U.S. Pat. No. 4,633,769 entitled "Roof Vent Fan Assembly".

Ordinarily, when the motor coach is being driven, the cover of the vent assembly is in the down position. The vent assemblies usually include an arm to raise and lower the cover between an open and closed position.

The disclosure provides a lock assembly to retain the cover in position during movement of the vehicle. The disclosure provides a locking mechanism which moves between an open and closed position to retain the cover in position during motion of the vehicle. The disclosure provides a fan assembly with a two point retention system to retain the cover in position during motion of the vehicle.

SUMMARY

According to a first aspect of the disclosure, a vent assembly comprises a base with an optional rotatable fan assembly mounted on the base to rotate a fan blade in the base. A cover is movably coupled with the base such that it moves between an open and a closed position. A locking mechanism is associated with the base. The locking mechanism includes a latch and a linkage coupled with the latch to move the latch between a locked and an unlocked position. A member extends from the cover. The member cooperates with the latch such that when the latch is in a locked condition, the cover is secured with the base in a closed position. When the latch is in an unlocked condition, the cover is enabled to be pivoted away from the base into an open position.

Accordingly to a second aspect of the disclosure, the locking mechanism is provided for use with a vent assembly including a base and a cover. The locking member comprises a latch and a linkage coupled with said latch. The linkage moves the latch between a locked and an unlocked position. A member extends from the cover. The member cooperates with the latch such that when in a locked condition, the cover is locked with said base in a closed position. When the latch is in an unlocked condition, the cover is enabled to pivot away from the base to its open position. The latch is hook shaped and includes a ramped surface. The member is a post extending from the cover which can be formed unitarily with the cover. The post includes a head with a planar surface which is contacted by the ramp surface of the latch. The linkage has two ends. The latch is secured at one end of the linkage and a handle is secured at the other end. The linkage includes a rotatable rod coupled to the latch.

Accordingly to a third aspect of the disclosure, a vent assembly includes a two point cover locking mechanism. A cover is movably coupled with a base between an open and a closed position. A locking mechanism is associated with the base. The locking mechanism includes a latch and a linkage coupled with the latch. The linkage moves the latch between a locked and an unlocked position. A member extends from the cover. The member cooperates with the latch such that when the latch is in a locked condition, the cover is secured with the base in a closed position. When the latch is in an unlocked condition, the cover may pivot away from the base to an open position. An arm is coupled with the cover. The arm raises and lowers to move the cover between its open and closed position. The arm is positioned adjacent the fan on one side of the base. The locking mechanism is positioned on a side opposite to that of the arm. The latch is hook shaped and includes a ramped surface. The member is a post extending from the cover which can be formed unitarily with the cover. The post includes a head which has a planar surface which is contacted by the ramp surface of the latch. The linkage has two ends with the latch at one end and a handle at the other end. The linkage includes a rotatable rod coupled to the latch.

Further areas of applicability will become apparent from the provided description. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a perspective view from inside of the base with the locking mechanism in a first closed position.

FIG. 3 is a view like FIG. 2, with the locking mechanism in an opened position.

DETAILED DESCRIPTION

The following description is merely exemplary in nature and is not intended to limit the present disclosure, application, or uses.

Figure 1:
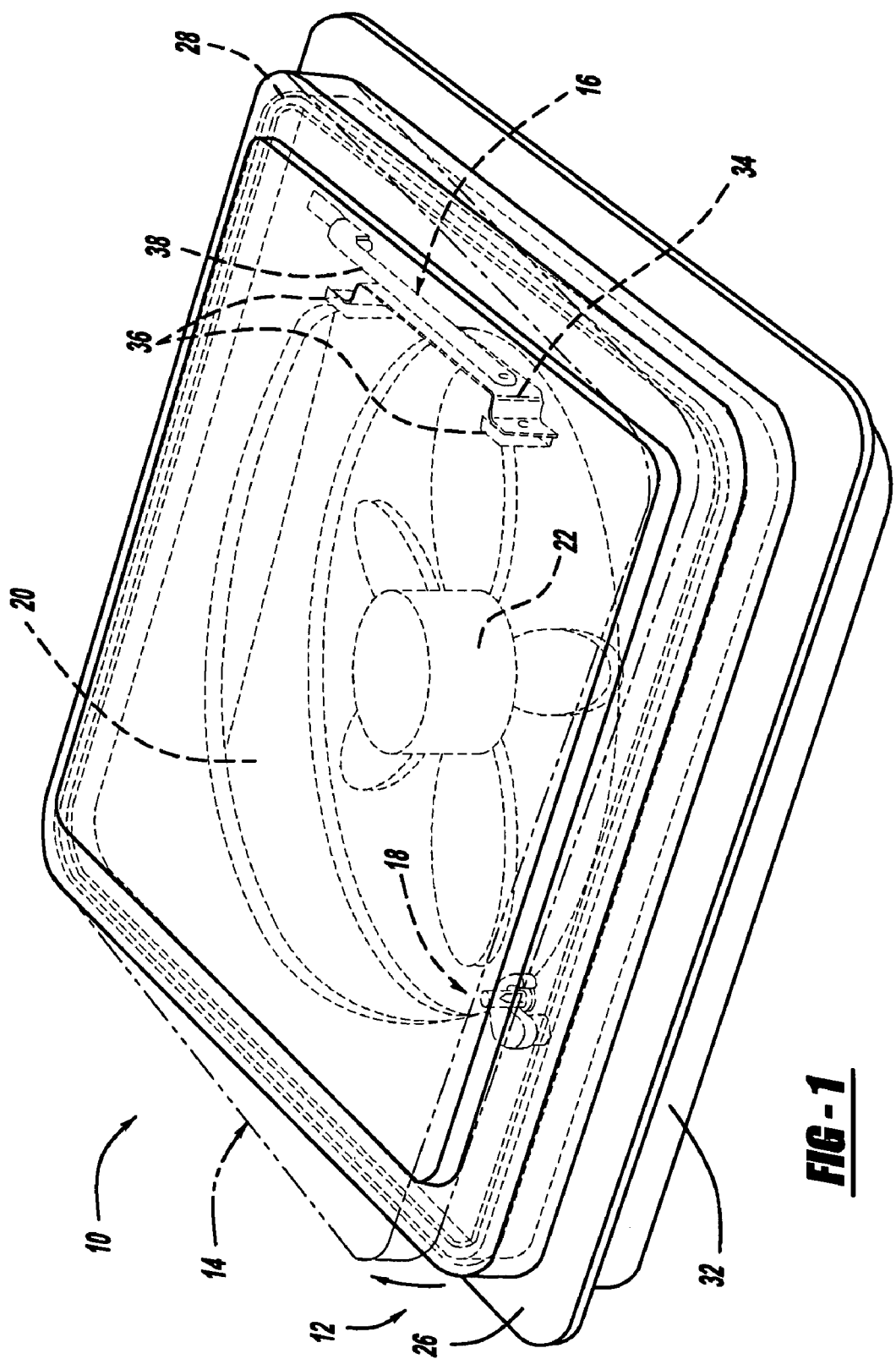
FIG. 1 is a perspective view of a vent assembly with a locking mechanism.

Turning to the figures, particularly FIG. 1, a vent assembly is illustrated and designated with the reference numeral 10. The vent assembly includes a base 12 and a cover 14 pivotally attached to the base 12. An arm mechanism 16 pivots the cover 14 between an open and closed position. A locking mechanism 18 is associated with the base 12.

A fan 20 and motor 22 are optionally mounted in a cylindrical opening 24 in the base 12. The base 12 includes a peripherally extending deck 26 which enables the base 12 to be mounted on a surface of the vehicle. The base 12 includes an upper portion 28 which enables securement of the cover 14, generally via a hinge (not shown), with the base 12. Also, a seal 30 is positioned about the periphery of the free end of the upper portion 28. The base 12 includes a lower portion 32 which enables the fan assembly 10 to fit through an opening in the vehicle.

The arm 16 is secured with a bracket 34. The bracket 34 is secured to extending members 36 on the cover 14. The bracket 32 includes a slot 38 to enable an arm pin to slide within the slot 38 so that the cover 14 is moved between its open and closed position.

Figure 5:
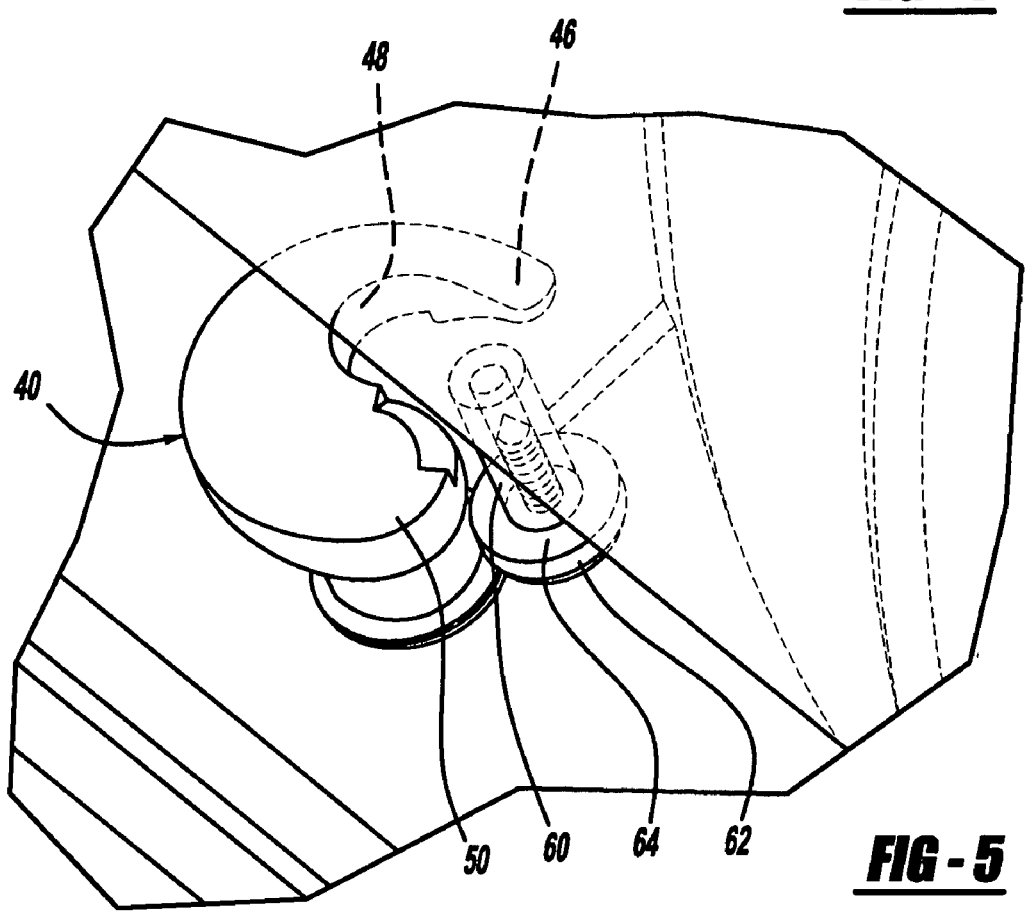
FIG. 5 is a perspective view of the locking assembly in an open position.

The locking mechanism 18 includes a latch 40. The latch 40 is connected with a linkage 42. The other end of the linkage 42 includes a handle 44. The latch 40 is an overall C or U shaped hook. The latch 40 tapers peripherally from its connection with the linkage 42 to its free extending end 46 as best seen in FIG. 5. An opening 48 is defined between the free end 46 and the connection end 50 of the hook. The latch free end 46 includes a ramp surface 52. The ramp 52 tapers away from the free end 46 such that the ramps 52 has its smallest thickness at the free end 46.

The linkage 42 is defined by a rod member with the latch 40 at one end and the handle 44 at the other. The linkage 42 extends through the base housing to position the latch 40 on top of the upper portion 28 and the handle on the bottom of the lower portion 32 Thus, as the handle 44 is rotated, the rod linkage 42 directly rotates the latch 40. The rotation of the handle 44 moves the latch 40 between an open or unlocked position to a closed or locked position as illustrated in FIGS. 2 and 3.

The cover 12 includes a projecting post member 60. The post member includes a head 62 extending from the post 60. The head 62 may be fastened with the post 60 or unitarily formed with it. The head 62 includes a planar surface 64 to contact the ramp 52.

Figure 4:
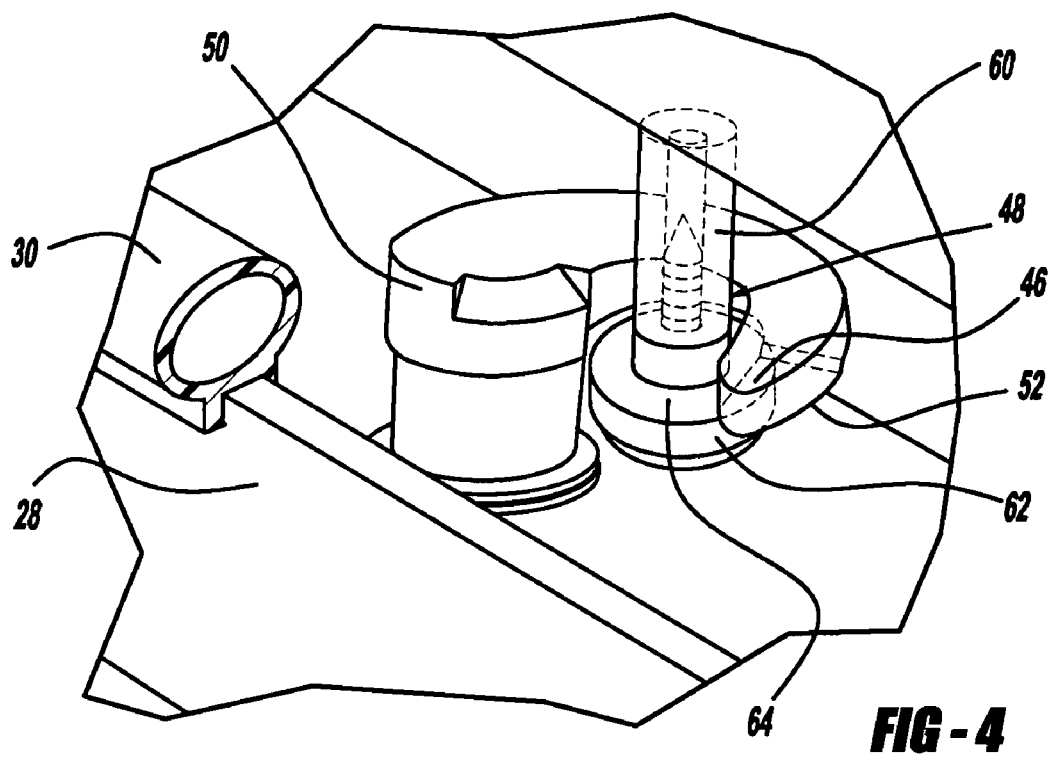
FIG. 4 is a perspective view of the locking mechanism secured on the post of the cover assembly.
Figure 6:
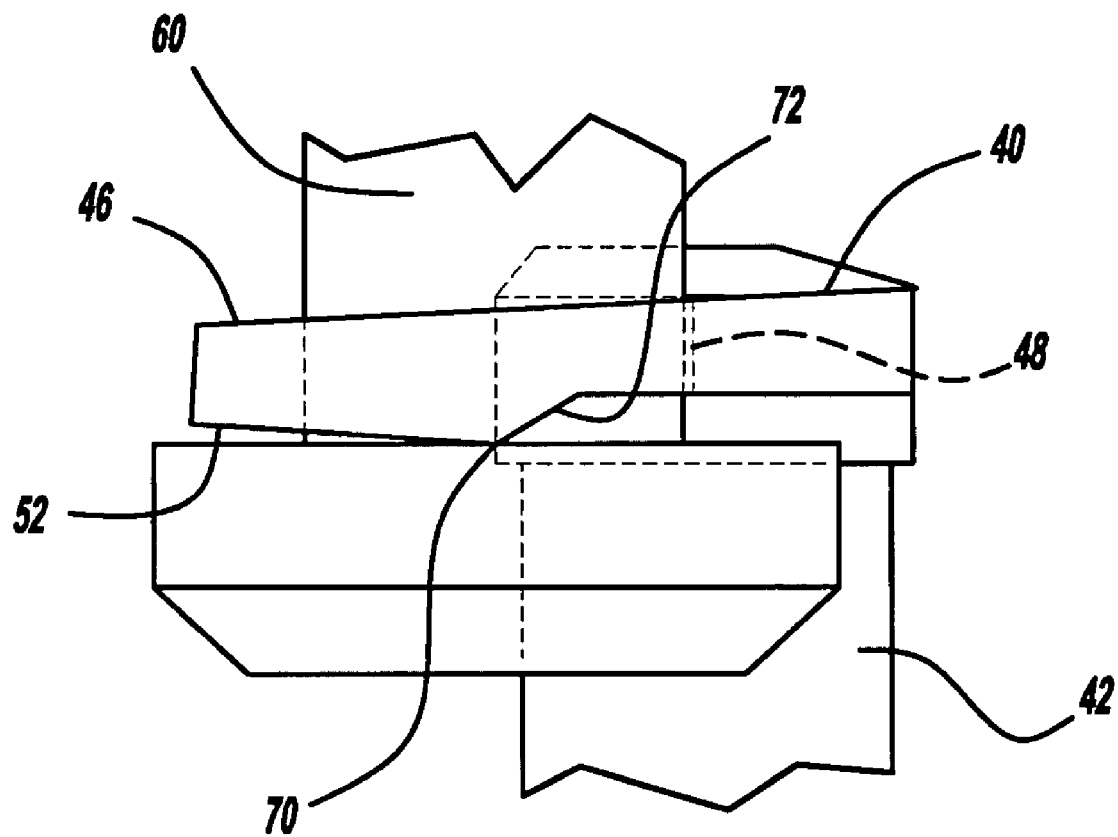
FIG. 6 is an elevation view of a portion of FIG. 4.

The latch 40 includes a stop 70. The stop 70 is positioned at the end of the tapered ramp 52. The stop 70 is defined by junction of the ramp surface 52 and end surface 72. The end surface 72 intersects the ramp surface 52 to form a wedge. The stop 70, with its wedge shape, has the end surface 72 angled towards or away from the tip 46 of the latch 40. Thus, the stop 70 has a biting line contact into the planar surface 64 of the head 62 to lock the latch 40 in its retained position as illustrated in FIGS. 2, 4, and 6.

The cover 14 is locked with the base 12 as follows. The locking member 18 is rotated via handle 44 which, in turn, moves the ramps 52 on the free end 46 of the latch 44 into contact with the planar surface 64 of the head 62. As this occurs, the ramp tapered surface 54 is in contact with the planar surface 64. As the handle 44 continues to rotate, the ramp surface 54 moves along the planar surface 64. As this occurs, the cover 12 is pulled downward in response to the tapered thickness of the ramp spaced away from the free end 46. Also, the wedge shape stop 70 comes into the contact with the planar surface 64. This biting action of the wedge shape stop 70 maintains the latch 40 on the head 62 while the latch is in contact with the head. Also, a portion of the latch 40 is above the head 62 to retain the head 62 from exiting the latch 40. As the handle 44 reaches its end of rotation, the cover 12 is snuggly pulled against the seal 30 on the periphery of the upper portion 28 of the base 12 as seen in FIG. 4.

To unlock the cover 14, the handle 44 is rotated in the opposite direction. As this occurs, the linkage 42 rotates the latch 40. The thickest portion of the ramp 52 moves away from the planar surface 64 of the head 62. This movement continues until the latch free end 46 releases from the planar surface 64 as seen in FIGS. 3 and 5. Thus, the cover 14 is able to be moved from its closed position to an open position.

A crank (not shown) is rotated which, in turn, causes the arm 16 to move away from the base 12. As this occurs, the arm pin slides in the slot 38 in the bracket 32. This movement raises the cover 14, as illustrated in phantom in FIG. 1, to an open position.

To return the cover 14 to its closed position, the crank is rotated in the opposite direction. Thus, the arm 16 pulls the cover 14 down to contact with the base seal 30. The arm 16 is on one side of the base 12 while the locking mechanism 18 is on the other. Thus, the arm 16 and locking mechanism 18 pull down two sides of the cover 14 to pull the cover 14 against the base 12. Thus, a two point cover retention is achieved. This maintains the cover 14 snuggly against the base seal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vent assembly with a cover locking mechanism comprising:
    a base;
    a cover movably coupled with said base between an open and closed position;
    a locking mechanism associated with said base, said locking mechanism including a latch and a linkage coupled with said latch for moving the latch between a locked and an unlocked position and a member extending from said cover, said latch including a stop, said member having a surface for cooperating with said latch stop such that when in a locked condition, said stop exerts a force on said member surface for locking the latch in a retained position so that said cover is locked with said base in said closed position and when in an unlocked condition said cover is enabled to pivot away from said base into said open position, wherein said latch is a hook shape comprising an extending end and an opening defined between said extending end and the main body of said hook, wherein said extending arm includes a ramp at one end and an end tapered surface extending away from said ramp, said stop formed at the junction of the end tapered surface and ramp surface so that said stop forms a biting line contact into the surface of the member extending from the cover.

2. The vent assembly with a cover locking mechanism of claim 1, wherein said member is a post having a head extending from said cover.

3. The vent assembly with a cover locking mechanism of claim 2, wherein said post is unitarily formed with said cover.

4. The vent assembly with a cover locking mechanism of claim 1, wherein said linkage has two ends, said latch secured at one said end and a handle at the other end.

5. The vent assembly with a cover locking mechanism of claim 1, wherein said cover member includes a planar surface for contacting said ramp.

6. The vent assembly with a cover locking mechanism of claim 1, wherein said linkage includes a rotatable rod coupled with said latch.

7. A locking mechanism for a vent assembly including a base and a cover comprising:
    a latch and a linkage coupled with said latch for moving the latch between a locked and an unlocked position and a member extending from the cover, said latch including a stop, said member having a surface for cooperating with said latch stop such that when in a locked condition said stop exerts a force on said member surface for locking the latch in a retained position so that the cover is locked with the base in a closed position and when in an unlocked condition the cover is enabled to pivot away from the base to an open position, wherein said latch is a hook comprising an extending end and an opening defined between said extending end and the main body of said hook, wherein said extending arm includes a ramp at one end and an end tapered surface extending away from said ramp, said stop formed at the junction of the end tapered surface and ramp surface so that said stop forms a biting line contact into the surface of the member extending from the cover.

8. The locking mechanism of claim 7, wherein said member is a post having a head extending from the cover.

9. The locking mechanism of claim 8, wherein said post is unitarily formed with said cover.

10. The locking mechanism of claim 7, wherein said linkage has two ends, said latch at one said end and a handle at the other end.

11. The locking mechanism of claim 7, wherein said cover member includes a planar surface for contacting said ramp.

12. The locking mechanism of claim 7, wherein said linkage includes a rotatable rod coupled with said latch.

13. A vent assembly with a two point cover retention mechanism comprising:
   a base;
   a cover movably coupled with said base between an open and closed position;
   a locking mechanism associated with said base, said locking mechanism including a latch and a linkage coupled with said latch for moving the latch between a locked and an unlocked position and a member extending from said cover, said member cooperating with said latch such that when in a locked condition said cover is locked with said base in a closed position and when in an unlocked condition said cover is enabled to pivot away from said base to said open position, wherein said latch has a hook shape comprising an extending end and an opening defined between said extending end and the main body of said hook, wherein said extending arm includes a ramp at one end and an end tapered surface extending away from said ramp, a stop is formed at the junction of the end tapered surface and ramp surface so that said stop forms a biting line contact into the surface of the member extending from the cover to exert a force on a surface of said member for locking said latch in a retained position with respect to said member;
   an arm coupled with said cover, said arm raising and lowering for moving said cover between said open and closed position, said arm positioned adjacent one side of said base,
   said locking mechanism positioned on an opposite side of said base from said arm.

* * * * *